United States Patent
Stevenson et al.

(10) Patent No.: US 8,670,672 B2
(45) Date of Patent: Mar. 11, 2014

(54) QUANTUM INFORMATION SYSTEM

(75) Inventors: Richard Mark Stevenson, Cambridgeshire (GB); Anthony John Bennett, Cambridgeshire (GB); Robert Young, Cambridgeshire (GB); Andrew James Shields, Cambridgeshire (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 674 days.

(21) Appl. No.: 12/834,926

(22) Filed: Jul. 13, 2010

(65) Prior Publication Data
US 2011/0013906 A1 Jan. 20, 2011

Related U.S. Application Data

(63) Continuation of application No. PCT/JP2009/050788, filed on Jan. 14, 2009.

(30) Foreign Application Priority Data

Jan. 14, 2008 (GB) .................................. 0800575.3

(51) Int. Cl.
*H04B 10/12* (2011.01)
(52) U.S. Cl.
USPC ........... 398/141; 398/140; 398/182; 380/256; 380/278
(58) Field of Classification Search
USPC ......... 398/140, 141, 151, 172, 182, 200, 201, 398/202, 214, 204; 380/256, 255, 277, 278
See application file for complete search history.

(56) References Cited

U.S. PATENT DOCUMENTS

| | | | | |
|---|---|---|---|---|
| 7,006,267 B2* | 2/2006 | Franson et al. | ............... | 359/107 |
| 7,683,361 B2* | 3/2010 | Edamatsu et al. | ............. | 257/13 |
| 8,023,828 B2* | 9/2011 | Beausoleil et al. | ........... | 398/140 |
| 8,135,276 B2* | 3/2012 | Munro et al. | .................. | 398/39 |
| 8,222,623 B2* | 7/2012 | Trojek et al. | ............... | 250/493.1 |
| 2002/0196827 A1* | 12/2002 | Shields et al. | ................. | 372/45 |

FOREIGN PATENT DOCUMENTS

| | | |
|---|---|---|
| JP | 2005-309012 | 11/2005 |
| JP | 2006-229608 | 8/2006 |
| JP | 2007-318445 | 12/2007 |

OTHER PUBLICATIONS

N. Akopian et al. ("Correlated and entangled pairs of single photons from semiconductor quantum dots", Journal of Applied Physics vol. 101, No. 8, Apr. 15, 2007, pp. 081712/1-4, XP-002542858).*
Akopian N. et al., Journal of Applied Physics, vol. 101, No. 8, Apr. 15, 2007 pp. 081712/1-4, XP-002542858.
Sanaka K. et al., Physical Review A, vol. 66, No. 4, Oct. 4, 2002 pp. 040301/1-4, XP-002542860.
Inoue K. et al., Physical Review A, vol. 67, No. 6, Jun. 2003 pp. 62319/1-4, XP002542861.
Office Action issued Mar. 26, 2013 in Japanese Patent Application No. 2010-527676 (with English translaiton).

(Continued)

*Primary Examiner* — M. R. Sedighian
(74) *Attorney, Agent, or Firm* — Oblon, Spivak, McClelland, Maier & Neustadt, L.L.P.

(57) ABSTRACT

According to one embodiment, a quantum information system includes a source of time dependent entangled photons and an indicating unit. The indicating unit indicates the entangled state of the entangled photons based on the emission time of one or more of the entangled photons.

20 Claims, 9 Drawing Sheets

(56) References Cited

OTHER PUBLICATIONS

N. Akopian, et al., "Entangled Photon Pairs from Semiconductor Quantum Dots", Physical Review Letters, Apr. 7, 2006, vol. 96, pp. 130501-1-130501-4.

Yoshihiro Nambu, et al., "Generation of Polarization—entangled Photon Pairs in a Cascade of two type-I Crystals Pumped by Femtosecond Pulses", Physical Review A. 2002, vol. 66, pp. 033816-1-033816-10.

* cited by examiner

QUANTUM INFORMATION SYSTEM

CROSS-REFERENCE TO RELATED APPLICATIONS

This is a Continuation Application of PCT Application No. PCT/JP2009/050788, filed Jan. 14, 2009, which was published under PCT Article 21(2) in English.

This application is based upon and claims the benefit of priority from British Patent Application No. 0800575.3, filed Jan. 14, 2008; the entire contents of which are incorporated herein by reference.

FIELD

Embodiments described herein relate to a quantum information system and method. More particularly, the embodiments relate to such a system and method which uses a photon source which emits photons with a time dependence to their entanglement.

BACKGROUND

Entangled photons are an essential resource for quantum key distribution over large distances and scalable linear optics for quantum computing. When two photons are entangled, both photons occupy a state which is a superposition of two states. Measurement of one photon causes the wave function to collapse which in turn sets the state for the other photon. The entanglement extends over long distances. Current entangled light sources concentrate on the time average relationship between paired photons. However, entanglement can evolve over the duration of a photon wave package and light states can show strong quantum correlations at an instant but can appear to be classical when averaged over time.

The inventors have surprisingly realised that many states which have previously been regarded as classical can in fact show entanglement when resolved as a function of time.

BRIEF DESCRIPTION OF THE DRAWINGS

FIG. 2a is a schematic of the further apparatus in accordance with an embodiment, FIG. 2b is a plot of the output of the source of FIG. 2a, FIG. 2c is a plot of the attenuation signal applied to the system of FIG. 2a, and FIG. 2d is the output of the system of FIG. 2a;

FIG. 5a shows experimental results demonstrating the fidelity of a time dependent entangled state with a maximally entangled state and FIG. 5b shows the corresponding theoretical prediction;

FIG. 8a is a schematic of the system in accordance with the further embodiment with a source which operates via biexciton decay with time selection acting on photon 2, FIG. 8b is a plot of the output of the source of FIG. 8a, FIG. 8c is a plot of the attenuator signal applied to the system of FIG. 8a, and FIG. 8d is the output of the system of FIG. 8a;

DETAILED DESCRIPTION

In general, according to one embodiment, a quantum information system includes a source of time dependent entangled photons and an indicating unit. The indicating unit indicates the entangled state of the entangled photons based on the emission time of one or more of the entangled photons.

A particularly useful type of entangled photon source is a source based on a quantum dot which operates using biexciton decay. However, other types of photon sources are possible such as photon sources which use parametric down conversion, CuCl crystals, two-photon interference. The advantage of semiconductor quantum dots is that their fabrication techniques are compatible with existing commercial production techniques.

In biexciton decay in quantum dots, interference between superpositions of exciton-photon pair drive the time dependent evolution of the entangled state. The entanglement evolves on the time scale of the biphoton lifetime. Integrated over detection time, such states present reduced entanglement or even classical behaviour.

In some embodiments one or both of the entangled photons are transmitted via a fibre or free space arrangement to a remote site. In such an arrangement, an eavesdropper can potentially intercept such communication and measure the energy of a photon. Thus if the system comprises transmission means such as a fibre or free space optics which are not secure.

In order to determine the entangled state, it is necessary to know how the entangled state evolves over time. This will vary dependent on the nature of the photon source. However, it is possible to perform measurements of the fidelity of the time dependent entangled state with a maximally entangled state or other entangled state in order to determine a time relationship between the two. Other means exist to estimate the time dependent nature of the time-evolving entangled state, for example by measuring the polarisation splitting of the emission.

Figure 1:
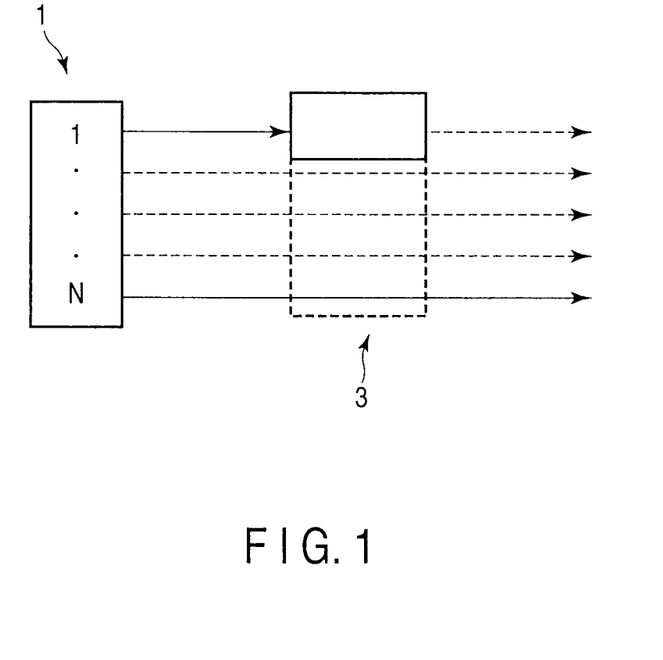
FIG. 1 is a schematic of a system in accordance with an embodiment.

The system of FIG. 1 comprises a source 1 of time dependent entangled photons. The source 1 emits N entangled photons where N is an integer. The source may be any source of time dependent entangled photons for example a source which operates involving parametric down conversion, CuCl crystals, two photon interference, quantum dots etc.

In time independent entanglement, each photon has a state which is a superposition of two states. When considering polarisation, a time independent entangled state may be represented by the following example:

$$\Psi_1(t) \propto (|HH\rangle + |VV\rangle)/\sqrt{2} \quad (1)$$

Here t is time, and HH and VV represent pairs of horizontally or vertically polarised photons. Many other time-independent entangled photon states exist, for example entangled in phase or with anti-correlated polarisation. However, in general all will have $\Psi_1(t) \propto \Psi_0$, where $\Psi_0$ does not vary with time.

In time dependent entanglement, the entangled state evolves over time. One possible representation of such a state is:

$$\Psi_2(\tau) \propto (|HH\rangle + e^{i\phi\tau}|VV\rangle)/\sqrt{2} \quad (2)$$

Where $\phi$ is a constant and $\tau$ is the time separation between the first and second photons. Other time dependent entangled states are possible where the two states which are superposed are different and/or where the entanglement varies with a time parameter other than the temporal separation between photons and/or where the entangled state has a different mathematical relationship with the time parameter.

When one photon from a time independent entangled photon pair is measured, the superposition collapses and the other of the photons acquires a well defined polarisation. For example, considering state $\Psi_1$ if the first photon measured is H polarised, then the other photons will also be H polarised. Also, if one photon is measured to have a circular polarisation, then the other photon will also be circularly polarised in the opposite direction.

When the photons are entangled in a time dependent manner, it is not possible to use entanglement by just simply measuring one of the photons since the entangled state is constantly varying. For example, if $\phi\tau=2\pi n$, (where n is an integer) then state $\Psi_2$ is the same as state $\Psi_1$ at that instant. However, if $\phi\tau=2\pi n+\pi$, then the entangled state is:

$$\Psi_2(\tau=2n\pi+\pi)/\phi) \propto (|HH\rangle - |VV\rangle)/\sqrt{2}$$

Here, in this state, photons have the same rather than opposite circular polarisations.

In FIG. 1, a time identification module 3 is provided which allows timing information concerning at least one of the photons to be determined. For example, the timing module may be configured to measure the delay between the two photons of $\Psi_2$. Alternatively other timing information may be derived which allows information about the entangled state to be determined. The timing module 3 may be configured to perform an actual time measurement on one or more of the photons or it may be configured to block or redirect photons which pass through the module at a certain time. In FIG. 1, the timing module 3 is shown receiving the direct output from the source 1. However, the timing module can be placed anywhere in the system.

FIG. 2a is a schematic of a further system in accordance with an embodiment. In FIG. 2a, the system is configured to only transmit photons which are indicated from timing information to have a particular entangled state.

Figure 2:
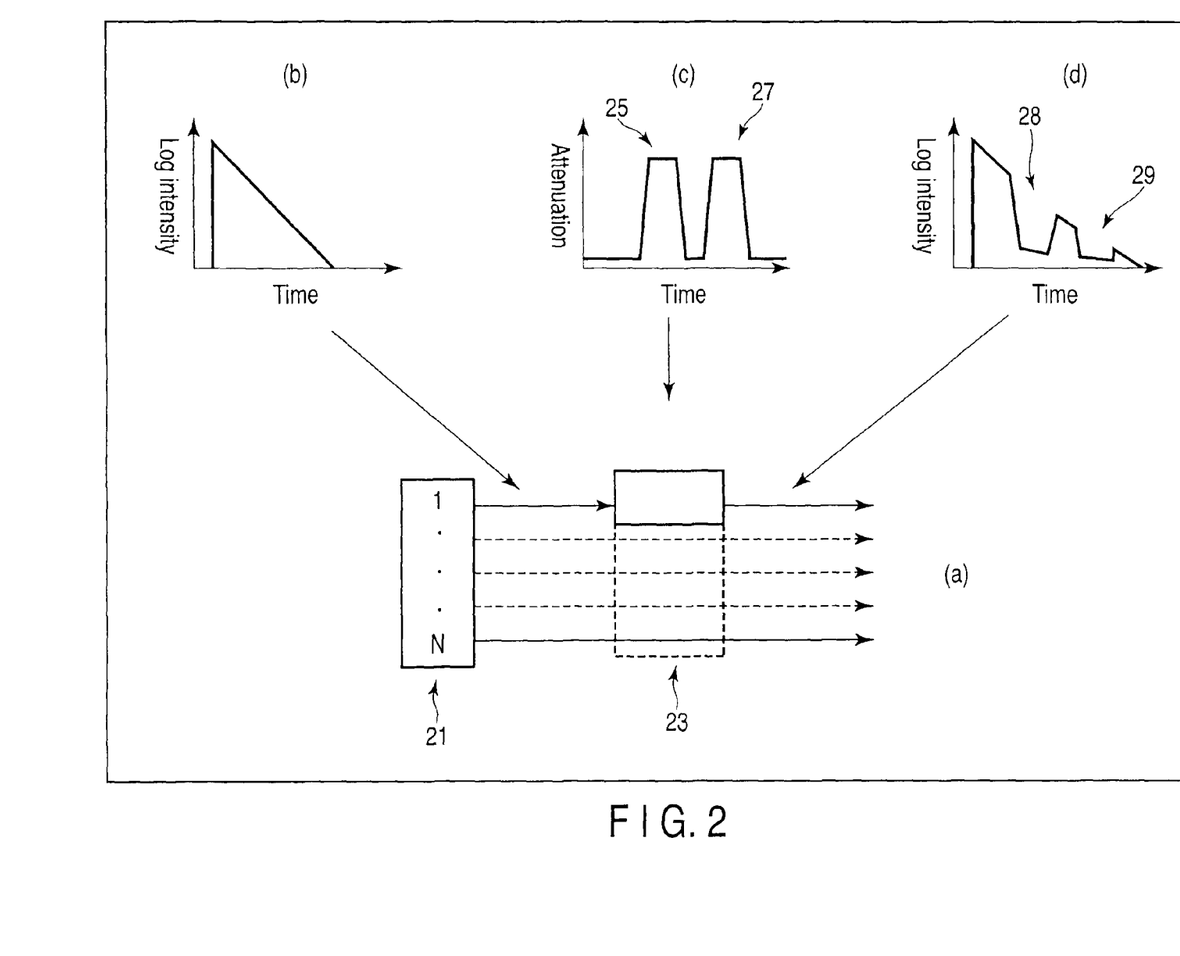
FIG. 2 shows a further apparatus in accordance with an embodiment.

In FIG. 2, the system comprises a source of entangled photons 21 and a timing module 23 in the form of an attenuator. The entangled photon source 21 generates N photons, where N is an integer of 2 or more. The N photons are entangled in a time dependent manner. In the figure, N is between 2 and 5 and between 1 and all paths pass through attenuator 23.

The output of the entangled photon source 21 is shown in FIG. 2b. On a log-lin scale the emission decays linearly, i.e. the decay is exponential on a linear scale. It should be noted that the form of the decay can be modified by electrical gates, the type of entangled photon source and other environmental factors. The form of the decay is not critical.

FIG. 2c shows the attenuation level applied by attenuator 23. The attenuator 23 modulates intensity on a timescale comparable to the lifetime of the photon. If a quantum dot (which will be described with reference to FIGS. 4 to 6C) is used as the source of entangled photons, the lifetime is usually of the order ~1 ns, so modulation would occur on a timescale of <1 ns.

The attenuator 23 varies the attenuation power as a function of time, as shown schematically in FIG. 2c. In this example two attenuating regions 25 and 27 as a function of time are shown. In attenuating regions 25 and 27 photons are blocked from passing through the attenuator 23. However, other forms of time dependent variation are possible, such as a single attenuating region or larger numbers of attenuating regions.

The resulting output signal is shown in FIG. 2d, and it can be seen that the intensity of the attenuated photon(s) is modulated. Dips 28 and 29 are seen in the output which is due to the action of attenuator 23. Detection of this photon is only likely during the high-intensity regions of time. Therefore, the entangled state can be predicted, since the detection time is well known. Note that although several probable detection time windows are possible in this example, they can be chosen to correspond to the same entangled output state, due to the periodic nature of evolution of entanglement.

The system of FIG. 2a is configured to use photons which have a specific entangled state by blocking photons which do not have the desired entangled state. The system determines the state from the time at which the photons pass through the attenuator 23.

It is also possible to use all photons providing that timing information is determined as part of the measuring process. Thus, the entangled state which is present can be determined from the timing information.

Figure 3:
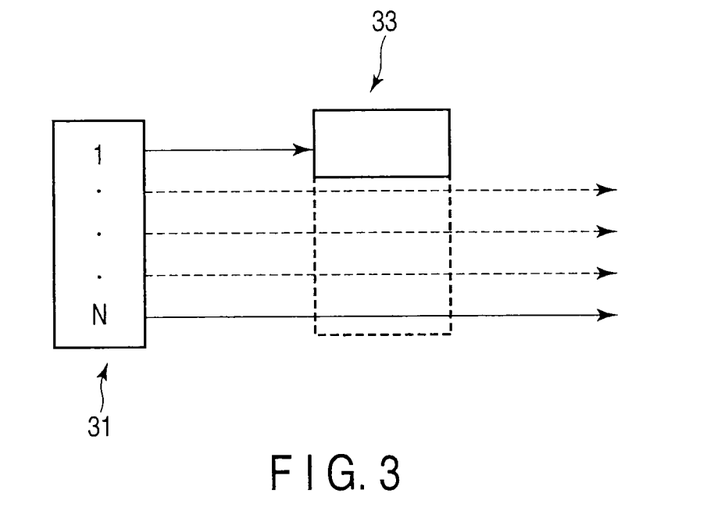
FIG. 3 is a schematic of a further system in accordance with an embodiment.

FIG. 3 shows such a system, comprising a source 31 of entangled photons and a time measurement module 33.

An example of a time measurement module 33 is an avalanche photo-diode in conjunction with a timer, although other types of optical detectors may also be used. By determining the time pertinent to the evolving entangled state, the entangled photon state is known, and can thus be used successfully.

Usually, before the system determines the pertinent time information by detection of one or more photons, it is necessary to use these photons as part of some optical process. As an example, the polarisation of the photon could be selected in a quantum key distribution (QKD) system. Such a system will be described with reference to FIG. 11.

In the simple system of FIG. 3, only the first photon (the upper arrow) which passes through the photon measurement system 33 is detected. Depending on how the entanglement evolves, a single timed measurement of one of the photons may be enough to establish the entangled state. An example of such a case could be a quantum dot with a fast $X_2$ lifetime compared to the X lifetime. Measurement of the X time would therefore determine $\tau$ with sufficient accuracy ($\tau=[t_X-t_{XX}]\approx t_X$ for $[t_X \gg t_{XX}]$).

For quantum dots producing entangled photons due to biexciton decay, the time pertinent to the evolution of the entangled photon state is the difference between the first and second photon emission times. Thus, both photons must preferably be measured. Other combinations of time measurements of multiple photons are also possible, and may be tailored to the specific source in use.

Entangled photons can be produced using a variety of different methods, e.g. parametric down conversion, use of interferometers etc. One particularly useful method is from the decay of biexcitons or higher order excitons produced in quantum dots. Quantum dots may be fabricated by techniques which are mostly used in high volume semiconductor production. Thus they are a particularly attractive source of entangled photons.

Figure 4:
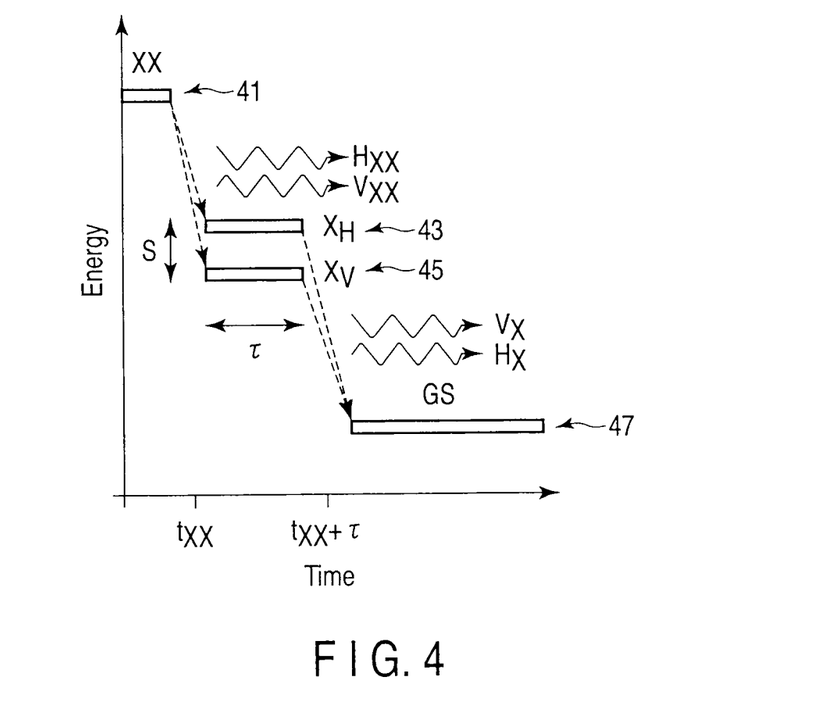
FIG. 4 is a plot showing the decay of a biexciton to produce time dependent entangled photons.

FIG. 4 indicates how entangled pairs are produced from biexciton decay. A biexciton is a bound state comprising a two electrons and two holes, as the state decays two photons are emitted.

The initial biexciton state 41 is indicated as XX, while the final state, the ground state 47, is indicated GS. The excitation that produces the biexciton state can, for example, be electrical or optical. The intermediate states 43, 45, labelled $X_H$ and $X_V$, are the non-degenerate exciton states which occur when one exciton in the biexciton has decayed while the other has not. The two non-degenerate optically active exciton levels 43, 45 have an energy splitting equal to the polarisation splitting S.

The decay may proceed via one of two paths. In the first path, the biexciton decays to exciton level 43 and then to the ground state 47. In the second path, the biexciton decays to exciton level 45 which has a lower energy than exciton level 43 and then decays to the ground state 47. Thus there are two alternative paths characterised by the choice of intermediate exciton level 43, 45. Depending on the path taken, both photons will be horizontally polarised or vertically polarised.

The exciton state is a superposition of the non-degenerate levels $X_V$ and $X_H$, and thus the emitted photons are entangled in polarisation. However, the entanglement produced is time dependent. As explained above, the exciton state is a superposition of the non-degenerate levels $X_V$ and $X_H$ and a phase difference between the two paths evolves during the time ($\tau$) spent there. After emission of the second, exciton photon, no further phase difference evolves and the total phase difference acquired by the V polarised photon pair component relative to the H polarised is $\Phi = S\tau/\hbar$. The resulting final photon pair state is the superposition of both paths, and is given by:

$$\Psi_2(\tau) = (|H_{XX}H_X\rangle + e^{iS\tau/\hbar}|V_{XX}V_X\rangle)/\sqrt{2} \quad (3)$$

The above state is entangled in polarisation, and the entanglement varies in time. The entanglement exists providing that there is no which-path information that can otherwise identify the polarisation of a photon. A time integrated measurement may allow the emission energy of a photon to be determined accurately enough to identify which of the intermediate exciton states was involved. When a timed measurement of a photon is performed, the entangled state collapses. However, as described herein it is possible to design a system where the energy of the photon is not measured with sufficient precision to allow the entangled state to be determined. This is achieved by accurate determination of the time parameter $\tau$. The Heisenberg uncertainty principle dictates that precise determination of time leads to large uncertainty in energy, via the relationship $\Delta E \Delta t \gtrsim \hbar$.

The net result from either decay path is that two photons are emitted with different polarisations. Since the final result under either decay path is identical, there is no information available regarding which decay path was followed. Consequently, until one or both of the photons is observed, for example by being detected, the two photons exist in a state that can only be described with reference to both photons. In other words, the photons are entangled. Thus, though the photons will have slightly different energies, the energy cannot indicate the polarisation of the photon unless a time integrated measurement is performed.

Figure 5:
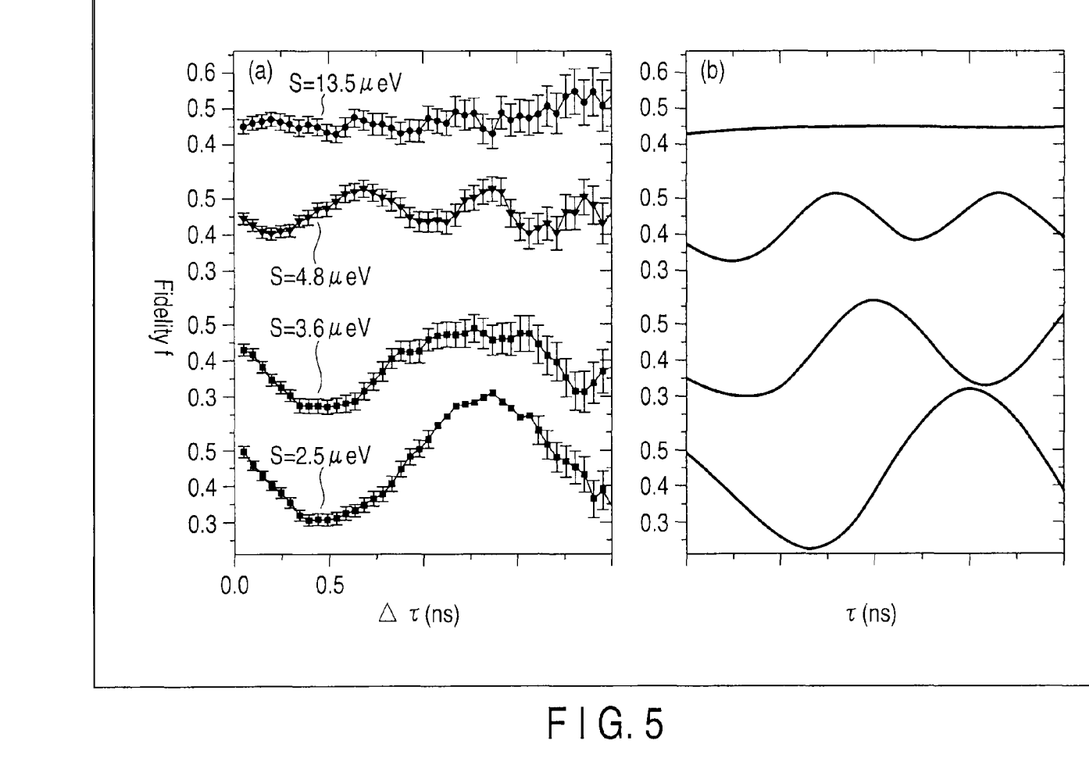
FIG. 5 shows the fidelity of a time dependent entangled state with a maximally entangled state.

FIG. 5a shows a plot of the fidelity of the time dependent entangled state compared with the maximally entangled state:

$$\Psi_1(t) \propto (|HH\rangle + |VV\rangle)/\sqrt{2} \quad (1)$$

For spin splitting values of S=13.5 µeV, 4.8 µeV, 3.6 µeV, 2.5 µeV. The results are plotted as a function of the delay ($\tau$) between the bi-exciton photon and the exciton photon.

The maximally entangled state $\Psi_1$ is the expected state for an ideal quantum dot with no spin splitting. To measure the fidelity as a function of the separation time $\tau$ between the two photons, the polarisation of each photon and the detection time when each photon arrives at the detectors is measured using a combination of linear polarising optics, avalanche photodiodes and time amplitude converters.

The degree of correlation is measured in the rectilinear ($C_R$), diagonal ($C_D$) and circular ($C_C$) polarisation basis. The fidelity is computed using the following equation:

$$f(\tau) = (C_R(\tau) + C_D(\tau) + C_C(\tau) + 1)/4$$

The above equation is valid if an unpolarised source is used. This is verified experimentally.

The time resolution of the technique is limited by two factors. The first is the systematic timing jitter associated with detecting a pair of photons using silicon avalanche photodiodes. In the experimental results shown in FIG. 5a, the corresponding response of the system was measured to have an FWHM of 577 ps. The second factor timing the time resolution is the integration time window which is selected to be 537 ps for measurements with S<4 µeV and 293 ps for S>4 µeV. The splitting S was controlled by applying an in-plane magnetic field to the quantum dot.

The measurements for the different splittings are offset vertically for clarity. Striking oscillations of fidelity are observed most clearly for the smallest investigated splitting of S=2.5 µeV. The oscillatory behaviour is due to the phase of the superposed state rotating away from the 0 and then returning to $2\pi$ which has a maximum fidelity f with the maximally entangled state $\Psi_1$. It is important to stress that when f is a minimum, entanglement still exists in the system but this time, there is a high fidelity with the state $(|HH\rangle - |VV\rangle)/\sqrt{2}$.

The frequency of the oscillation increases as the splitting S increases which is anticipated from equation 3. Increasing frequency is accompanied by a reduction in the amplitude of the oscillations. This is attributed to the frequency of the oscillations approaching the resolution limit of the system which tends to time average the oscillations. For the largest S measured of 13.5 µeV, oscillations can no longer be resolved.

Theoretical results are shown in FIG. 5b. This shows the modelled behaviour where the model state comprises 78% of light originating exclusively from the source and the remainder uncorrelated light contributed from light emission from other areas of the sample. The calculated behaviour also includes the effect of detected jitter and the integration time window.

Figure 6A:
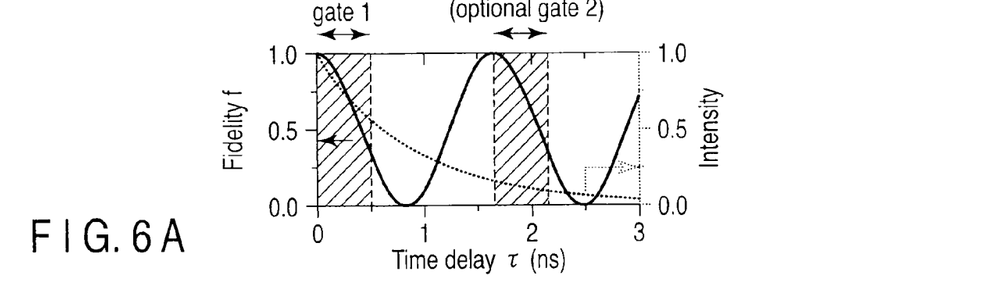
FIG. 6A is a plot of the theoretical fidelity and output intensity against decay time between photons.
Figure 6B:
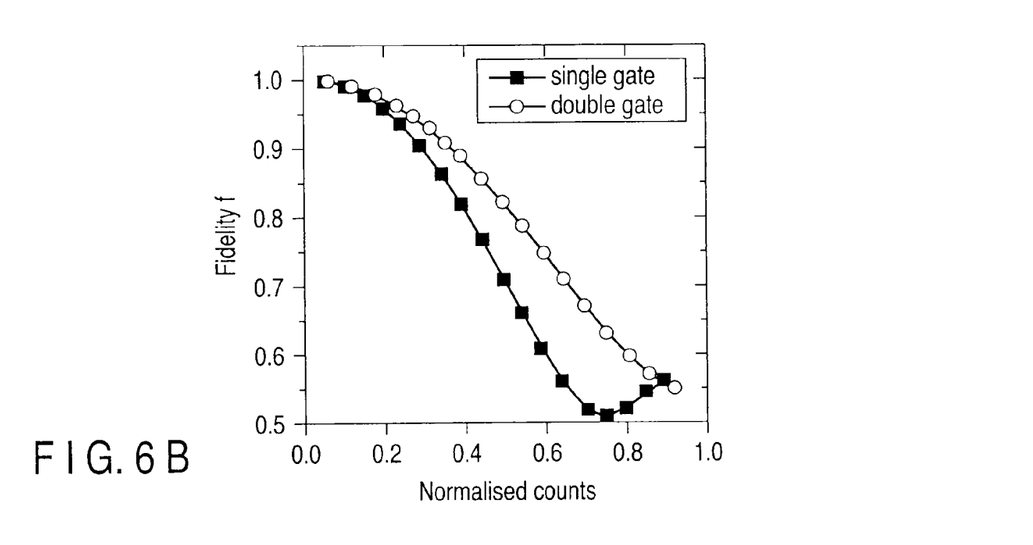
FIG. 6B is a plot of fidelity against normalised counts for a timing module using one gate and two gates.
Figure 6C:
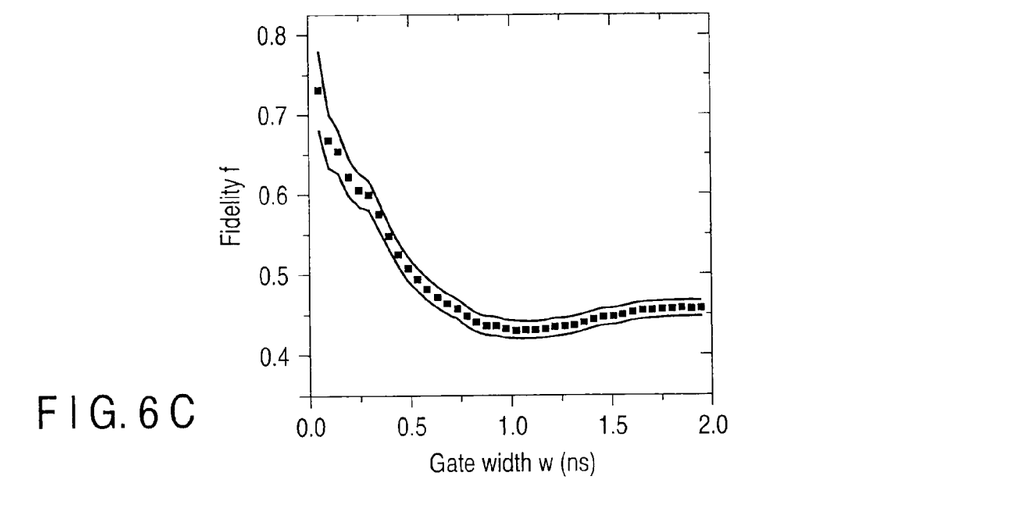
FIG. 6C is a plot of the experimental fidelity for a quantum dot as a function of the gate width.

The experimental constraints can be understood in more detail when referring to FIGS. 6A to 6C.

FIG. 6A is a theoretical plot of fidelity f against the separation $\tau$ between the biexciton and exciton photons. FIG. 6A shows the calculated fidelity for a splitting of 2.5 µeV measured with detectors having a theoretical jitter of 0. The fidelity varies periodically with the separation time.

Two gates are shown. The gates use time information to select photon pairs with desirable entanglement attributes. The x-axis is the time $\tau$ between the emission of the first photon and the second photon. Gate 1 from approximately 0 to 0.5 nanoseconds is chosen to be selected for a time when the exciton spends a time in the superposed state which gives rise to an entangled state which is close to the maximally entangled state $\Psi_1$. An optional gate 2 is used in addition to gate 1. Gate 2 is shifted one period from gate 1 in the periodically varying signal. Note that the term 'gate' is used here to describe discrimination in time delay for pairs of photons, rather than discrimination in real time for a single photon. In general however, the gate can describe a time selective process operating on any number of photons, and using any time dependent parameter.

The intensity of photon pair emission is plotted on FIG. 6A as a dot line on the right hand axis. The biexciton photon must always be emitted prior to the exciton photon, so the intensity is zero for τ<0. Therefore the first gate starts at τ=0 in this example. The start time of the second option gate is shown delayed by exactly one cycle, determined by the splitting S. This represents the most simple case, and the start time of both gates should be optimised independently for the specific application in order to maximise the fidelity with the desired maximally entangled state.

FIG. 6B shows the fidelity f against normalised counts. The normalised count rate of photons received at a detector is related to the gate width.

Reducing the normalised count rate from 1 to 0.75 by reducing the gate width causes a decrease in f. However, further reduction of the count rate increases f dramatically. Increasing f from 0.6 to 0.9 results in a reduction of the photon pair detection rate by only a factor of approximately 3. This is extremely efficient in comparison to energy resolved post selection.

This can be understood since time resolved post selection targets photons at the beginning of a decay cycle where the emission intensity is strongest. Thus, in contrast, energy resolved post selection targets photons with emitted energies between those of the $V_X$ and $V_H$ where intensity is a minimum.

The results for the double gate show increased efficiency. This is to be expected as photons are now detected at two time points where both time points are selected on the basis of the theoretical maximum fidelity.

The effect of reducing the gate width on the fidelity is shown in FIG. 6C for a quantum dot with S=2.5 μeV. Points show the measured fidelity f of the gated emission with $\Psi_1$. Error bounds are shown by lines. The start of the gate is fixed at τ=0. For a gate width w=2 ns, the fidelity f is measured to be 0.46±0.01, which does not exceed the 0.5 required to indicate entanglement. However, as the gate width is reduced below ~1 ns, the fidelity begins to increase, up to a maximum of 0.73±0.05 for the smallest gate width of w=49 ps, indicating entanglement. This is a consequence of resolving entanglement before the state has significantly evolved over time. Equivalently, reducing the gate width reduces the uncertainty of the biphoton delay τ, which increases the uncertainty in the energy sufficiently to mask the which path information from the splitting S.

Figure 7:
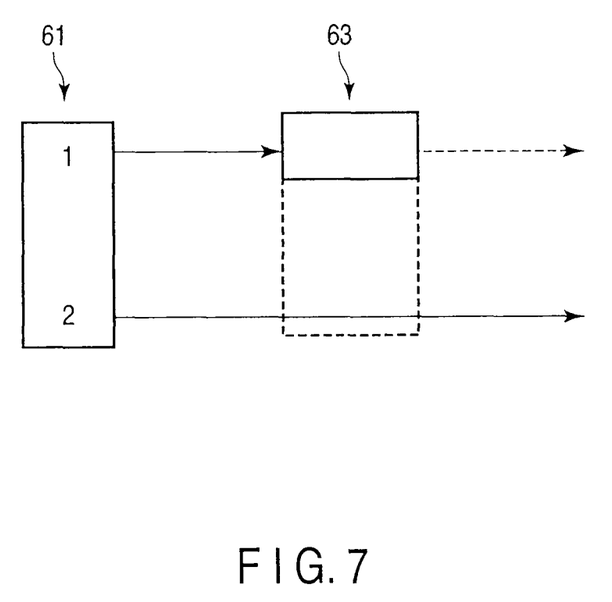
FIG. 7 is a schematic of a system in accordance with an embodiment.

FIG. 7 is a schematic of a system in accordance with an embodiment where the source 61 produces a pair of time dependent entangled photons from bi-exciton decay. Since the photons are produced from biexciton decay there are 2 entangled photons. As explained with reference to FIG. 1, the entangled photons are passed through a timing module which can supply timing information about the photons which pass through it which allows the entangled state to be determined.

The timing module may be configured as an attenuator to block photons emitted at a specific time. It may also be provided as a means for detecting photons with time information. The timing module may be provided after other optics which manipulate the photons emitted by the source 61.

Figure 8:
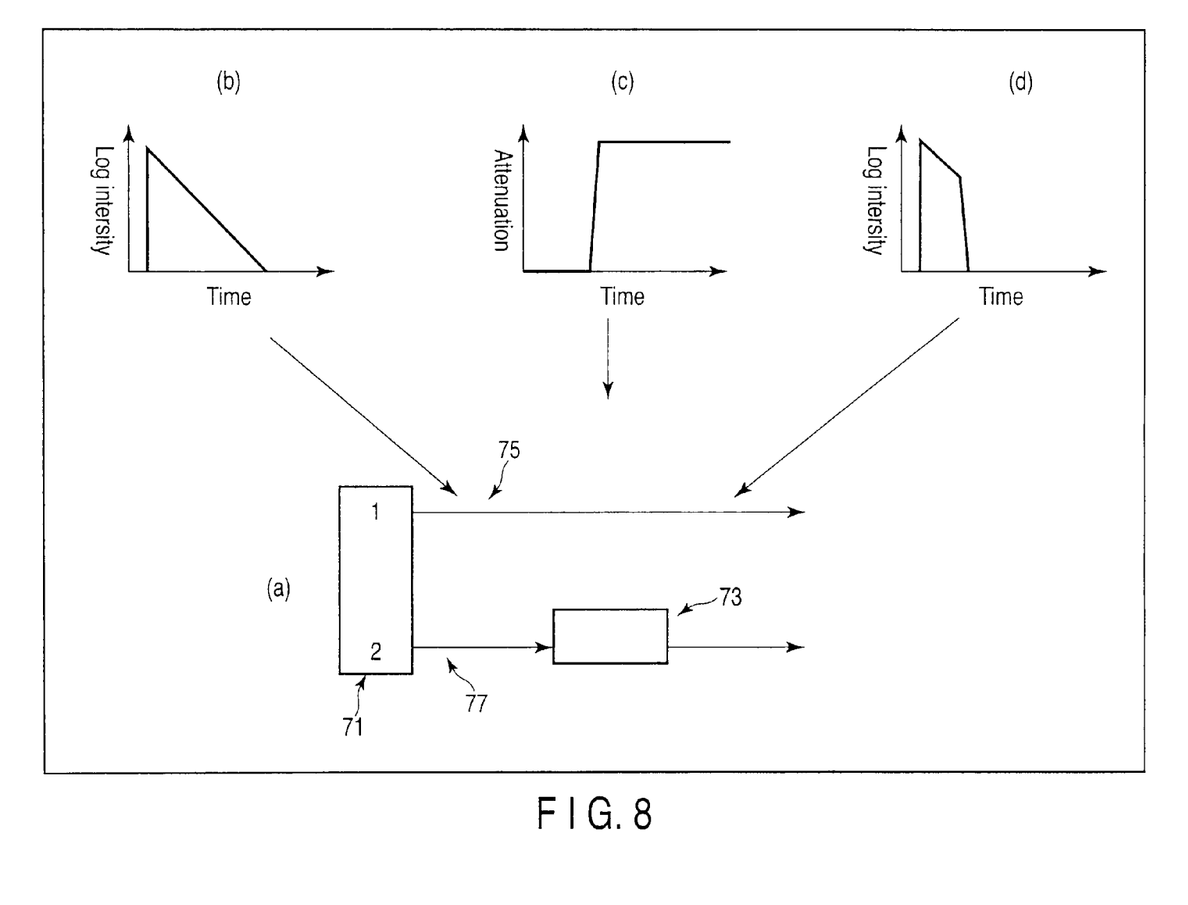
FIG. 8 shows a system in accordance with a further embodiment.

FIG. 8a shows a system in accordance with an embodiment in which the exciton photon 77 from a quantum dot source 71 is blocked by an attenuation system 73. In this specific system, the photon due to biexciton decay 75 does not pass through the attenuator 73.

FIG. 8b is a schematic of the intensity (logarithmic axis) of the output of the photon source over time.

For quantum dots, the emission cycle of the first, biexciton, photon 75 begins at a well-determined time, triggered by the optical or excitation of the quantum dot 71. Thus, attenuating this photon 69 as a function of time relative to the trigger, will result in a modulated optical output signal corresponding to a well defined time of the biexciton decay cycle.

The same is not true for the second, exciton, photon 71 since this emission cycle begins after decay of the first photon 69, which has an inherent uncertainty in time. Thus, intensity modulation should be performed relative to the biexciton detection time (apparatus not shown), not relative to the trigger. Accordingly, if the uncertainty in the biexciton emission time is short, the time of emission of the second photon relative to either the trigger or first photon will be substantially equal. Thus in the example given, the system will function optimally using a quantum dot source with short biexciton lifetime compared to exciton lifetime. Such a situation may be achieved by incorporating the quantum dot into an optical cavity resonant with the biexciton transition.

FIG. 8c shows the signal applied to attenuator 73. The attenuator substantially blocks the exciton photon after a time w from the trigger, resulting in a shorter output optical signal. The length of the time w and the corresponding output signal as shown in FIG. 8d are sufficiently short enough to limit the time in order to determine a time-independent output entangled state.

The attenuation may, for example, be provided by an acoustic optic modulator, or a fast optical switch. In the case of an optical switch, the diverted fraction of the photon beam may also be used, and detection of a diverted photon can indicate the presence of another type of entangled state.

Figure 9:
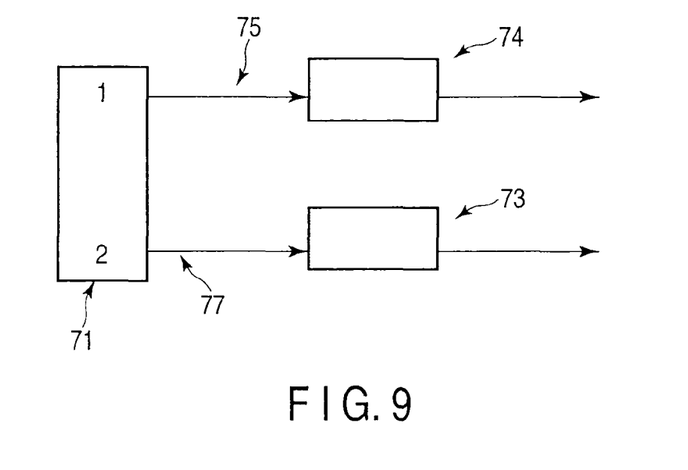
FIG. 9 is a schematic of a system in accordance with a further embodiment with a source which operates via biexciton decay with time selection acting on both photons.

FIG. 9 shows a system in accordance with an embodiment in which both the exciton photon 77 and the biexciton photon 75 from a quantum dot source 71 enter independent attenuation systems 73 and 74. The system operates in a similar manner to that of FIG. 8a, except both photons are attenuated as a function of time.

The attenuation as a function of time may be fixed on each channel, or vary dependent on further time measurement of either photon. By limiting the emission of both photons to short time windows, the time delay t can be estimated with sufficient accuracy to determine the entangled state. There are no requirements for the $X_2$ lifetime to be short in this example.

Figure 10:
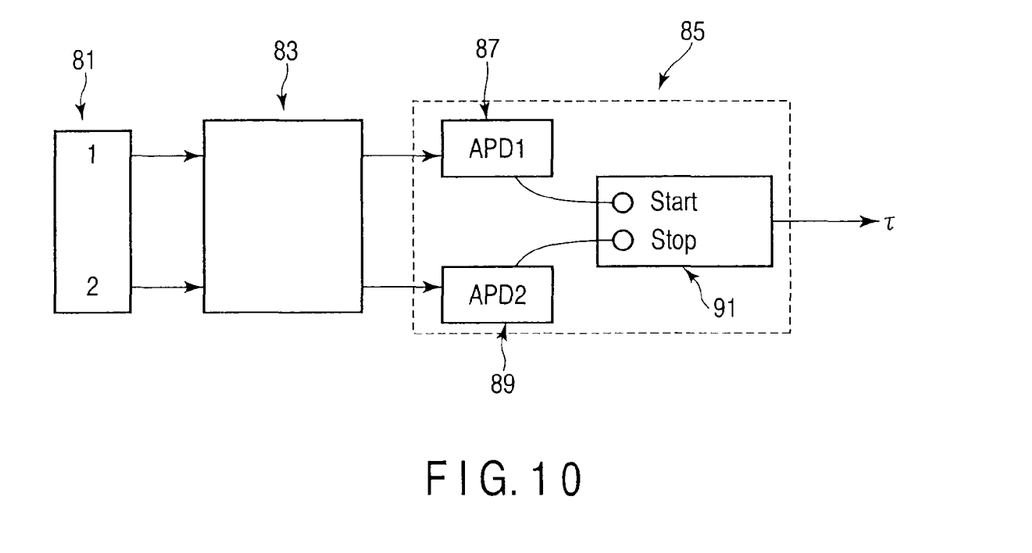
FIG. 10 is a schematic of a system in accordance with a further embodiment with a biexciton photon source and a time measurement module.

FIG. 10 is a schematic of a system in accordance with a further embodiment with a photon pair source 81.

Photons outputted from the source 81 pass through application optics 83. Application optics manipulate the entangled photons as required for the specific application for which they are designed. An example of application optics are the optics required in quantum key distribution. Further examples are quantum logic gates, entanglement swappers, quantum repeaters, quantum memory storage and retrieval systems.

The photons then pass from the application optics 83 into the time identification module 85. The time identification module comprises first 87 APD which receives the photon produced from biexciton decay. The time identification module also comprises a second APD 89 which receives the photon produced from exciton decay. The first 87 and second 89 APDs are both connected to a timer 91. The system is configured such that first APD 87 starts the timer when it detects a photon and the second APD 89 stops the timer 91 when it detects a photon. Thus, timer 91 is capable of measuring the delay between the two photons and hence can measure the temporal separation between the two photons which existed when they were output from the photon source 81.

Thus, as previously described, knowledge of the delay time τ between the two photons allows the entangled state to be identified.

In FIG. 10, the timing module 85 is shown as a single unit which receives the output of the application optics 83. However, the timing module 85 may be partially or fully integrated with the optics and possibly divided into two or more units which can communication with each other.

Figure 11:
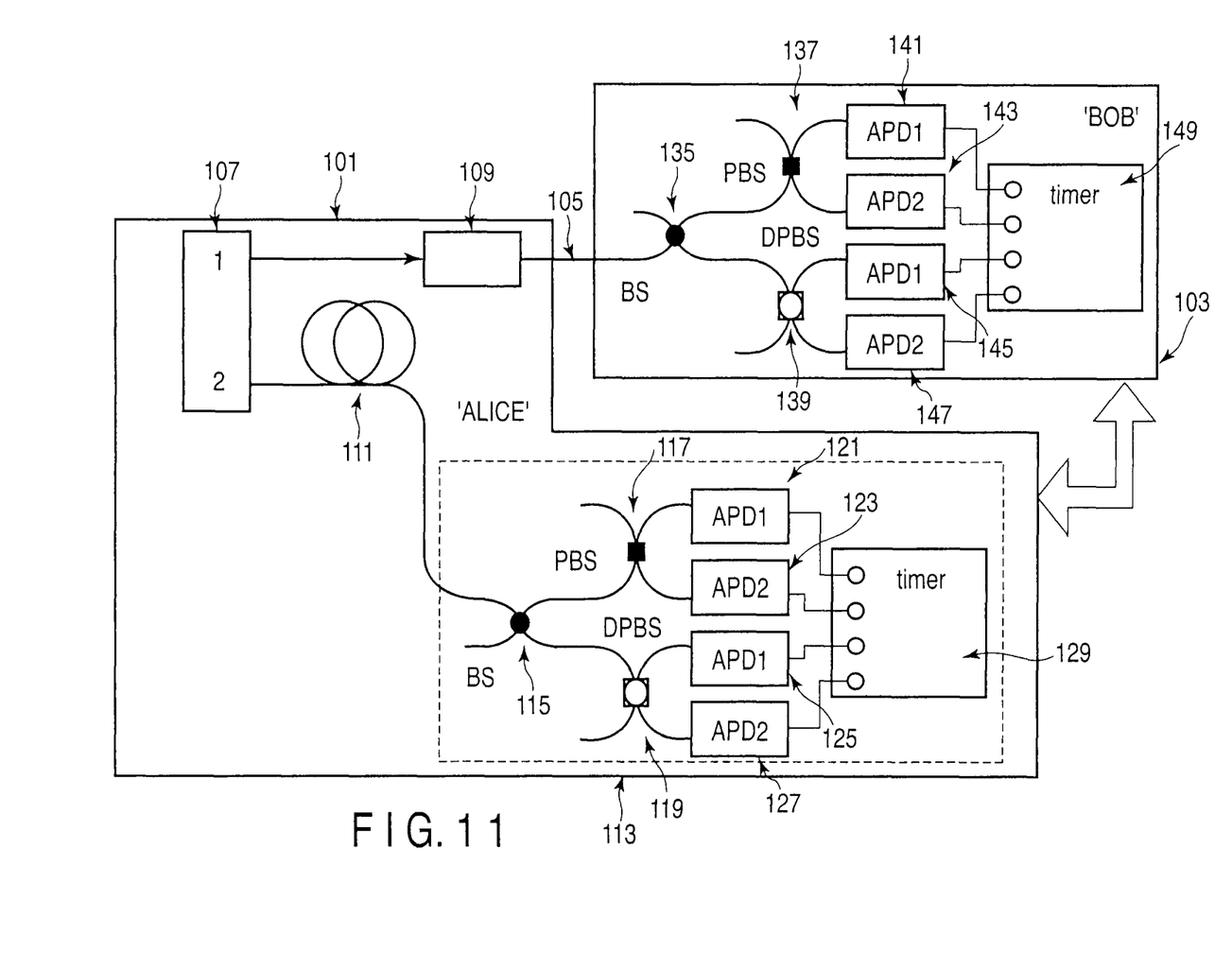
FIG. 11 is a schematic of a quantum communication system in accordance with an embodiment.

FIG. 11 schematically illustrates a system in accordance with a further embodiment. The system is based closely on the system of FIG. 10. However, in FIG. 11, the application optics are those of a QKD system.

In QKD, secret key data may be transmitted from a sender (Alice) 101 to receiver (Bob) 103 down an optical fibre 105. On successful formation of a secret key, the key is used to encrypt information which is then communicated over classical link 103.

Alice's equipment comprises an entangled photon source 107 which generates entangled photons from biexciton decay. The entangled photon source outputs a first photon from bi-exciton decay to an attenuator 109 which serves to time limit the wave packet of the biexciton photon.

Time measurement must be performed before transmission of any photons down the publicly accessible optical fibre 105. This is because otherwise an eavesdropper (or hacker) can intercept photons, and make a time-integrated measurement such as an energy measurement to uniquely determine the polarisation of the photon. In the system shown here, the time measurement is the attenuation of the first (biexciton) photon so that the length of the wavepacket is reduced, increasing the uncertainty in energy.

Interception of the biexciton photon by a eavesdropper along fibre 105 will result in destruction of entanglement, introducing errors into bobs measurement. Thus provided no errors are detected during privacy amplification, any transmission can be guaranteed to be secure.

The other photon which is emitted due to exciton decay is directed into delay loop 111 so that it is not measured before the biexciton photon enters bob's equipment. Otherwise, the light state propagating down channel 105 would no longer be entangled, and the system would be insecure. Alternative delay systems include a quantum memory. The photon then enters Alice's measurement module 113.

The photon signal emitted due to exciton decay is then directed into 50/50 non-polarising beamsplitter 115 which is an Alice's measurement module 113.

Non-polarising beamsplitter 115 can direct photons to a first polarising beamsplitter 117 or a second polarising beamsplitter 119. First polarising beamsplitter 117 is a rectilinear polarising beamsplitter and second polarising beamsplitter 119 is a diagonal polarising beamsplitter. Thus, non-polarising beamsplitter 115 randomly directs photons to be measured in either a first polarising measurement basis which is rectilinear or a second polarising basis which is diagonal.

First polarising beamsplitter 117 directs its output into either avalanche photodiode (APD) 121 or APD 123. Second polarising beamsplitter 119 directs its output into either APD 125 or APD 127. All four APDs 121, 123, 125 and 127 are connected to timing module 129. Timing module 129 is configured to communicate over a classical channel 131 with the receiver Bob 103.

The second polarising beamsplitter may be constructed using a polarising beamsplitter and an half wave plate or joining a polarising maintaining fibre to a polarising beamsplitter at an appropriate angle (usually 45°).

Although four APDs are shown which are used to detect photons from the four possible polarisation combinations, a single detector may be used which is multiplexed. The detection time is recorded using timer 129 along with the polarisation and clock cycle of the photon.

The photon which was generated by the biexciton decay is transmitted through optical fibre 109 to Bob's receiver 103. The equipment of Bob's receiver is similar to that at Alice's measuring module 113. First, the photon impinges on a non-polarising beamsplitter 135. Again, this polarising beamsplitter can direct photons either to first polarising beamsplitter 137 which is in this example a rectilinear polarising beamsplitter or second polarising beamsplitter 139 which in this example is diagonal polarising beamsplitter. The beamsplitters may be configured as described with reference to Alice's module 113.

First polarising beamsplitter 137 directs photons either to APD 141 or ADP 143. Second polarising beamsplitter 139 directs photons either to first ADP 145 or ADP 147. All four APDs 141, 143, 145 and 147 are connected to timer 149. Timer 149 is in communication with Alice's timer 129. The timers 149 and 129 may be configured in the same manner as the timer 91 described with reference to FIG. 10. The detectors record the absolute arrival times of Alice and Bob's photons. The delay times τ are calculated later by Alice, as described below.

To form a key, Alice 101 must be able to predict Bob's 103 measurement. Thus, Alice 101 must know both the basis and time of Bob's 103 measurement for each photon he receives. This information can be transmitted across a classical channel 131. As with known QKD methods, an eavesdropper cannot predict Bob's 103 measurements from this data alone. Alice 101 calculates the time between photons 1 69 and 2 from the difference between the time measurements of Bob 103 and herself 101. She 101 then selects periods (photon pairs) for which the entangled state at the corresponding time is useful to predict Bob's 103 measurements.

Examples of suitable periods include times for which $\Psi_2(\tau) \propto (|HH\rangle + |VV\rangle)/\sqrt{2}$ or $\Psi_2(\tau) \propto (|HH\rangle - |VV\rangle)/\sqrt{2}$. Within this subset of periods, Alice 101 then selects periods when the combination of measurement bases chosen by Alice 101 and Bob 103 allow Alice 101 to predict Bob's 103 measurement. For the examples above, this would be the periods when Alice 101 and Bob 101 detect in the same measurement basis. However, this is not always the case. For example, for $\Psi_2(\tau) \propto (|HH\rangle + i|VV\rangle)/\sqrt{2}$, measurement of the first photon in the diagonal basis would ensure the second photon is in the circular basis. Thus Alice 101 would only accept periods for which the bases chosen were different between Alice 101 and Bob 103.

Once the periods (photon pairs) which Bob's 103 outcome can be predicted are determined by Alice 101, both parties can form keys based on their measurements, assigning values of 1 and 0 to Bob's 103 measurements (or predicted measurement) in a pre-agreed way. The QKD may then proceed according to standard practice, by privacy amplification, and comparison of some part of the key in order to detect errors introduced by an eavesdropper.

Time dependent entangled photons can also be used to implement optical quantum logic gates. The modifications required to the logic gates include additional means to determine or limit the detection time of the photons. This is required to pin down the form of the entangled state at the instant of measurement. The knowledge of the form of the entangled state is then fed back into the system in order that the gate returns the correct result.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum information system comprising: a source of time dependent entangled photons, and an indicating unit based on the emission time of one or more of said entangled photons configured to indicate that the entangled state of said entangled photons has a higher fidelity with a first predetermined superposition of states than with a second predetermined superposition of states.

2. A quantum information system according to claim 1, wherein said entangled photons are entangled in at least one selected from polarisations, phase, time, energy, angular momentum, and spatial mode.

3. A quantum information system according to claim 1, wherein the system is configured to identify the entangled state and adapt itself to process photons or results derived from the measurements of photons depending on the identified entangled state.

4. A quantum information system according to claim 1, wherein the indicating unit comprises a selecting unit configured to select photons with a particular entangled state.

5. A quantum information system according to claim 4, wherein a fidelity of said time dependent entangled state with the predetermined entangled state varies periodically and said selecting unit is configured to select photons with a particular entangled state from two or more periods.

6. A quantum information system according to claim 4, wherein said selecting unit comprises a time dependent switch.

7. A quantum information system according to claim 6, wherein said switch comprises an acousto-optic device or a fast optical switch.

8. A quantum information system according to claim 4, wherein said selecting unit is an attenuator configured to block photons not having the predetermined entangled state.

9. A quantum information system according to claim 4, further comprising a detector and said selecting unit being provided to apply a timing signal to said detector.

10. A quantum information system according to claim 3, further comprising a detector, and said indicating unit is configured to determine the delay between entangled photons arriving at said detector in order to identify the entangled state.

11. A quantum information system according to claim 1, wherein said source of entangled photons comprises a quantum dot device, operable to emit entangled photon pairs as a result of the decay of one or more biexcitons confined within said quantum dot.

12. A quantum information system according to claim 11, wherein said indicating unit is configured just to measure the emission time of the photon emitted due to the exciton decay which follows the biexciton decay.

13. A quantum information system according to claim 1, further comprising a transmission means configured to transmit one of said entangled photons and an attenuator configured to time limit the wavepacket of a photon prior to transmission by said transmission means.

14. A quantum information system according to claim 1, further comprising a first transmission means configured to transmit one of said photons to a first site and a second transmission means configured to transmit the other of said photons to a second site, the system further comprising one or more delay lines configured to compensate for differences in transmission times of the photons through the first and second transmission means such that said photons remain entangled as they are transmitted along the transmission means.

15. A quantum information system according to claim 1, further comprising an encoding unit configured to encode information on said photons and a decoding unit configured to decode said information from said photons.

16. A quantum information method comprising:
providing a source of time dependent entangled photons; and
performing a timing measurement on the emission time of one or more of said entangled photons to indicate the entangled state of said entangled photons has a higher fidelity with a first predetermined superposition of states than with a second predetermined superposition of states.

17. A quantum information method according to claim 16, further comprising: identifying the entangled state and processing photons or results derived from the measurements of photons depending on the identified entangled state.

18. A quantum information method according to claim 16, comprising selecting photons with a predetermined entangled state.

19. A quantum information method according to claim 18, comprising blocking photons not having the predetermined entangled state.

20. A quantum information method according to claim 17, comprising applying a timing signal to a photon detector.

* * * * *